United States Patent
Nichols et al.

(10) Patent No.: US 6,310,875 B1
(45) Date of Patent: Oct. 30, 2001

(54) METHOD AND APPARATUS FOR PORT MEMORY MULTICAST COMMON MEMORY SWITCHES

(75) Inventors: Stacy W. Nichols, Kanata; David A. Brown, Carp; David G. Stuart, Almonte, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/050,013

(22) Filed: Mar. 30, 1998

(51) Int. Cl.[7] .............................. H04L 12/54; G06F 12/00
(52) U.S. Cl. ...................... 370/388; 370/395; 370/412; 370/429; 711/5
(58) Field of Search .................................. 370/390, 395, 370/401, 432, 412, 428, 429, 235, 232, 392, 388, 418, 400, 230; 711/1, 4, 5, 112

(56) References Cited

U.S. PATENT DOCUMENTS

| | | | | |
|---|---|---|---|---|
| 5,436,893 | * | 7/1995 | Barnett | 370/392 |
| 5,583,861 | * | 12/1996 | Holden | 370/395 |
| 5,689,500 | * | 11/1997 | Chiussi et al. | 370/235 |
| 5,825,767 | * | 10/1998 | Mizukoshi et al. | 370/395 |
| 5,860,080 | * | 1/1999 | James et al. | 711/4 |
| 5,963,552 | * | 10/1999 | Joo et al. | 370/390 |

OTHER PUBLICATIONS

H. Yamanaka et al., "A Scalable Nonblocking Shared Multibuffer ATM Switch with a New Concept of Searchable Queue," ISS'95, Apr. 1995, vol. 1, pp. 278–282.

* cited by examiner

*Primary Examiner*—Alpus H. Hsu
*Assistant Examiner*—Afsar M. Qureshi
(74) *Attorney, Agent, or Firm*—Finnegan, Henderson, Farabow, Garrett & Dunner, L.L.P.

(57) ABSTRACT

Methods, systems, and networks for tracking multicast cell copies in a switch. The switch includes a plurality of output ports each having an associated output port register, and a port memory controller for receiving a bit map on the enqueue of a cell into the switch. The bit map includes a bit for each output port register. The port memory controller writes to each output port register the bit from the bit map for that port register. The value of a bit in an output port register indicates whether a copy of the enqueued cell is to be transmitted from the output port associated with that output port register.

34 Claims, 15 Drawing Sheets

METHOD AND APPARATUS FOR PORT MEMORY MULTICAST COMMON MEMORY SWITCHES

BACKGROUND OF THE INVENTION

The present invention relates to multicasting in a communications network and, more particularly, to a method and apparatus for port memory multicast cell tracking in common memory switches for use in an asynchronous transfer mode (ATM) network.

ATM networks pass data in the form of cells. The cells, which are of fixed size, pass through one or more switches on the way to a specified destination that may be another switch, a terminal, or some other component in the network. An individual cell may need to be sent to several different destinations in the network from a single switch.

For purposes of this discussion, the term "multicasting" refers to the distribution of a cell to multiple destinations. When multicasting, an individual cell is copied in a switch, and the copies are sent to multiple destinations from the switch. In a common memory switch, the cell copying operation can be efficiently achieved by storing the cell in memory and generating multiple copies of the cell memory location (the cell address). Each copy of the cell address is stored at an output queue of the switch. A count memory stores a count of the number of copies of the cell made and transmitted. As copies of the cell exit the switch, the count in the count memory decrements. When the last cell copy is transmitted, the value of the count in the count memory is zero. At this point the address can be reused for another cell and is returned to a list of free memory locations.

One known multicast cell counting implementation uses a single memory to count the cell copies exiting the switch. FIG. 1 is useful for discussing the single memory multicast count implementation. This implementation requires several memory operations to track cell copies. The cell count value (ie., the number of copies of the cell to be transmitted) is written to the memory 10 on enqueue, i.e., when a cell enters the switch (step 12). When a cell leaves the switch, the cell count value is read (step 14) from the multicast count memory and decremented (step 16). The decremented count value is then written to and stored in the multicast count memory (step 18). A cell count value of zero indicates all cell copies have been transmitted from the switch to the intended destinations.

This approach thus requires three memory accesses on the memory per cell cycle. For purposes of this discussion, a cell "cycle" is the enqueuing of a single cell to a switch and the dequeuing of that cell from the switch. Since three memory accesses are performed for each cell cycle, the memory must function three times as fast as the cell rate. This performance requirement for the memory greatly limits the types of memory that can successfully perform the task of multicast counting in high capacity common memory switches. Generally, only small, fast memories are capable of supporting this implementation. This limits the capacity of the switch or restricts the number of memory locations that can be used for multicast cells, as the multicast counting operation is the most demanding (in terms of memory bandwidth) in a common memory switch.

Another known cell counting implementation is disclosed and claimed in U.S. patent application Ser. No. 08/994,792, titled "Method and Apparatus for Banked Multicast Common Memory Switches" and filed on Dec. 19, 1997, which is hereby expressly incorporated by reference. In this implementation, two separate memories are used to count cell copies to be transmitted, resulting in a reduced number of memory accesses per memory per cycle. While this approach is an improvement over the single memory implementation, it can not dequeue cells at the full rate when commercial L2 cache memory and banking techniques are used.

It is, therefore, desirable to provide a method and apparatus for multicasting incorporating a cell tracking strategy having a reduced number of per-memory accesses and capable of cell dequeue rates that permit use of commercial memories.

SUMMARY OF THE INVENTION

The present invention satisfies this and other desires by providing a port memory multicast common memory switch and associated control strategy providing multicast cell counting having a reduced number of per memory accesses per cycle and supporting full rate cell dequeue.

A method for tracking multicast cell copies in a switch in an ATM network consistent with the present invention includes the steps of enqueuing a cell into the switch, and receiving a bit map into a port memory controller on the enqueue of a cell into the switch, the bit map including a bit corresponding to each output port register. The method also includes the step of writing to each output port register a bit from the bit map corresponding to that port register. The method further includes the steps of, on a cell dequeue, clearing the bit in the output port register associated with the output port from which the cell was dequeued, and reading the bits in the other output port registers. When all bits have been cleared, the cell has been sent out the appropriate number of times and the cell address may be used to store other cells.

An apparatus for tracking multicast cell copies and including a plurality of output ports from which cell copies are transmitted toward destinations includes a plurality of output port registers, each output port register being associated with at least one switch output port, and a port memory controller for receiving a bit map on the enqueue of a cell into the switch. The bit map includes a bit corresponding to each output port register, and the controller includes means for writing to each output port register the bit from the bit map corresponding to that port register.

Another method consistent with the present invention tracks multicast cell copies in a switch including a port memory controller and a plurality of groups of output ports, each group having an associated output port register. The method includes the steps of enqueueing into the switch a cell to be dequeued from the switch, and receiving a bit map into the port memory controller on the cell enqueue, the bit map including a bit corresponding to each output port register. The method also includes the steps of writing to each output port register the bit from the bit map corresponding to that output port register, the bit indicating that at least one copy of the enqueued cell is to be dequeued from the group of output ports associated with that output port register; and maintaining a count of the copies of the cell that have been dequeued from each group of output ports. The method also includes the steps of determining when the last copy of the cell has been dequeued from a group of output ports; and clearing the bit in the output port register after the last copy of the cell has been dequeued from the group associated with the output port register.

Another apparatus consistent with the present invention tracks multicast cell copies and includes a plurality of output ports from which cell copies are dequeued toward destinations. The apparatus includes a plurality of output port registers, each output port register being associated with a group of switch output ports, and first and second multicast cell count memories for storing a cell count value used to determine when a last cell copy has been transmitted from a group of switch output ports. The apparatus also includes a port memory controller for receiving a bit map on the enqueue of cell into the switch, the bit map including a bit for each output port register.

Yet still another apparatus consistent with the present invention tracks multicast cell copies and includes a plurality of output ports from which cell copies are transmitted toward destinations. The apparatus includes a plurality of output port registers, each output port register being associated with at least one switch output port, and first and second port memory controllers, at least one of the controllers receiving a bit map on the enqueue of a cell into the switch, the bit map including a bit corresponding to each output port register in a group of output port registers associated with the at least one controller that received the bit map. The controller includes means for writing to each output port register in the group the bit from the bit map corresponding to that port register.

Yet still another method consistent with the present invention tracks multicast cell copies in a switch in an ATM network, the switch including first and second port memory controllers, a plurality of output ports, and a plurality of output port registers, each output port register being associated with at least one switch output port. The method includes the steps of enqueueing a cell into the switch, and receiving a bit map into at least one of the port memory controllers on the enqueue of the cell, the bit map including a bit corresponding to each output port register in a group of registers associated with the at least one controller that received the bit map. The method also includes the step of writing to each output port register in the group a bit from the bit map corresponding to that port register.

Networks consistent with the present invention are also provided. One network includes a plurality of nodes sending and receiving cells, and a switch interconnecting the nodes. The switch includes a plurality of output ports from which cell copies are transmitted, and a plurality of output port registers, each output port register being associated with a switch output port. The switch also includes a port memory controller for receiving a bit map on the enqueue of a cell into the switch, the bit map including a bit for each output port register, and the controller includes means for writing to each output port register the bit from the bit map for that port queue.

Another network consistent with the present invention includes a plurality of nodes sending and receiving cells, and a switch interconnecting the nodes. The switch includes a plurality of output ports from which cell copies are dequeued toward destinations, and a plurality of output port registers, each output port register being associated with a group of switch outport ports. The switch also includes first and second multicast cell count memories for storing a cell count value used to determine when a last cell copy has been transmitted from a group of switch output ports, and a port memory controller for receiving a bit map on the enqueue of cell into the switch, the bit map including a bit for each output port register.

The advantages accruing to the present invention are numerous. For example, multicast memory structures consistent with the present invention feature a reduced number of memory accesses (i.e., two) per cycle. Further, when memory addressing is aligned with memory banking, full rate cell dequeue is achieved.

The above desire, other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Figure 2:
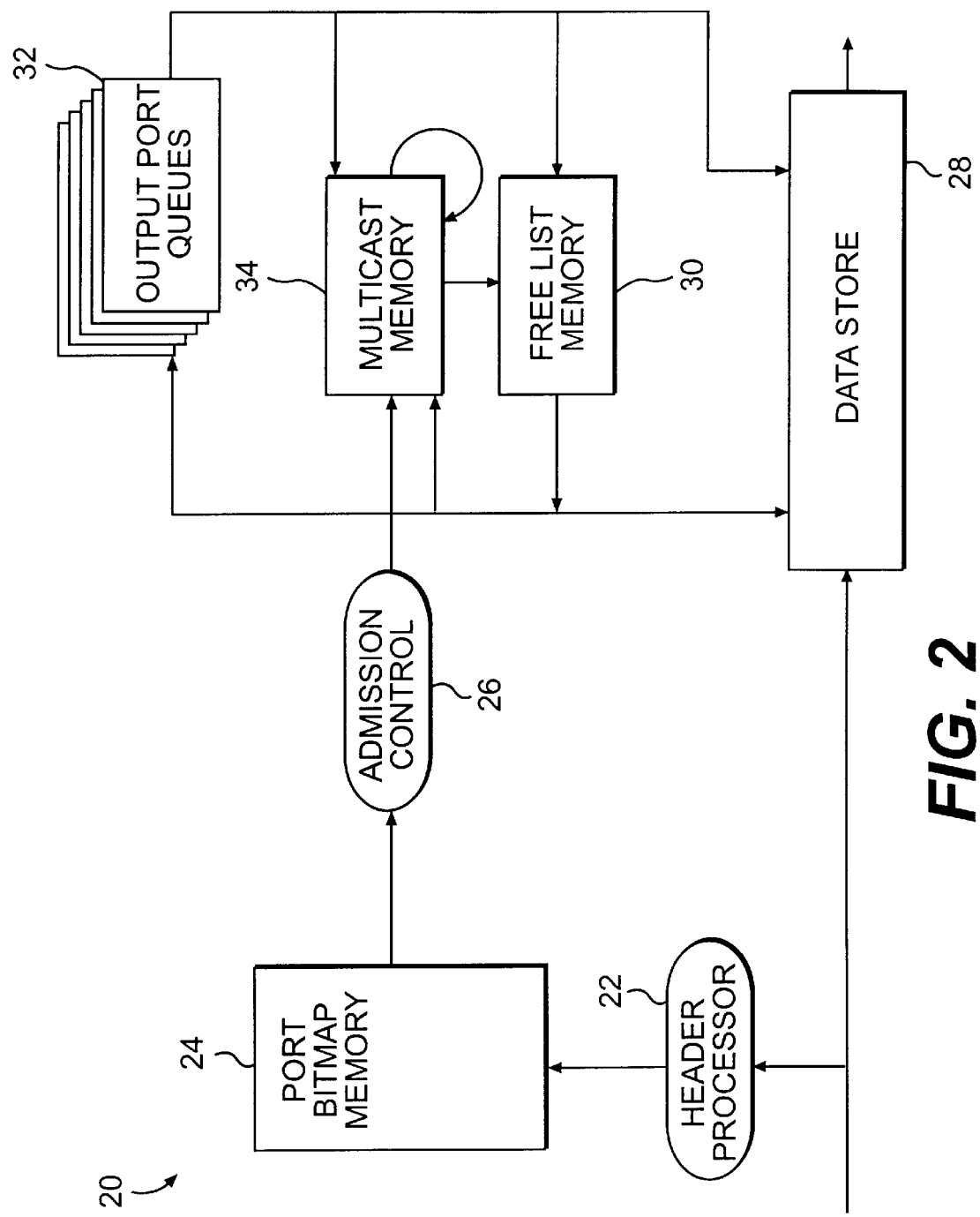
FIG. 2 is a block diagram of a common memory switch architecture consistent with the present invention.

FIG. 2 shows a block diagram of a common switch architecture 20 capable of supporting multicasting and within which a multicast memory controller consistent with the present invention may be used. As shown, the architecture includes header processor 22, port bitmap memory 24, admission control 26, data store 28, free list memory 30, a plurality of output port queues 32, and a multicast memory 34. When a cell arrives at a switch (cell enqueue), the cell header or routing tag is examined by header processor 22. The header contains a pointer into the port bitmap memory 24, which may be configured as a destination look-up table.

Figure 3A:
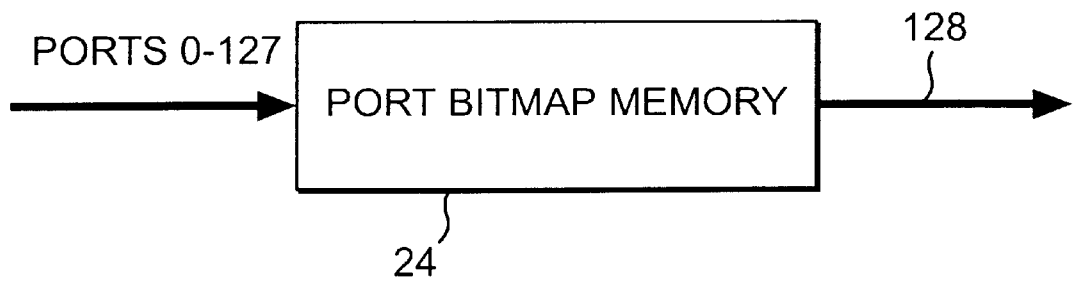
FIGS. 3a–3b are single memory and banked memory implementations of the port bitmap memory shown in FIG. 2.
Figure 3B:
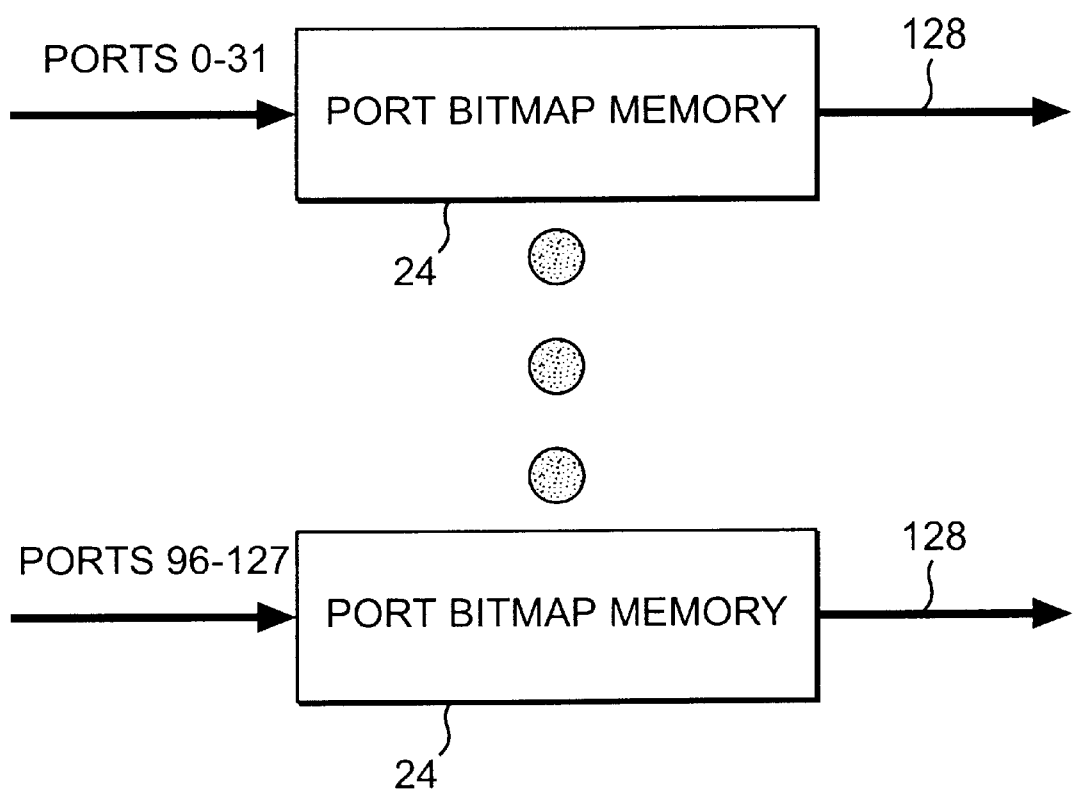

Port bitmap memory 24 is used to determine if the cell is to be multicast and the destinations (i.e., switch output ports)

of the cell. Preferably, port bitmap memory 24 operates at the cell ingress rate to support back-to-back multicast cells, and has a width equal to the number of switch outputs. Memory depth depends on the number of multicast connections supported. A single memory (one set of memories performs the lookup for all input ports) and a multiple memory implementation (multiple memories each support a subset of the input ports) of the port bitmap memory 24 are shown in FIGS. 3a and 3b, respectively.

From the port bitmap memory 24, the header/routing tag proceeds to admission control 26, which determines whether the cell will be permitted to enter the switch based, as is known, on output queue size, and memory fill, to name a few. If the cell is permitted to enter the switch, an address is extracted from free list memory 30. Free list memory 30, which may be implemented as a FIFO memory, contains the addresses of locations in the data store memory that are unused, i.e., addresses where cells can be stored. Memory 30 should be able to support the full ingress rate (handing out unused addresses) and the full egress rate (recovering used addresses). The depth and width is a function of the size of the data storage, e.g., the free list memory should have an address corresponding to each data storage location and the width should correspond to the number of bits needed to express the address size of the data store.

Figure 4A:
FIG. 4a–4b are single memory and banked memory implementations of the free list memory shown in FIG. 2.
Figure 4B:
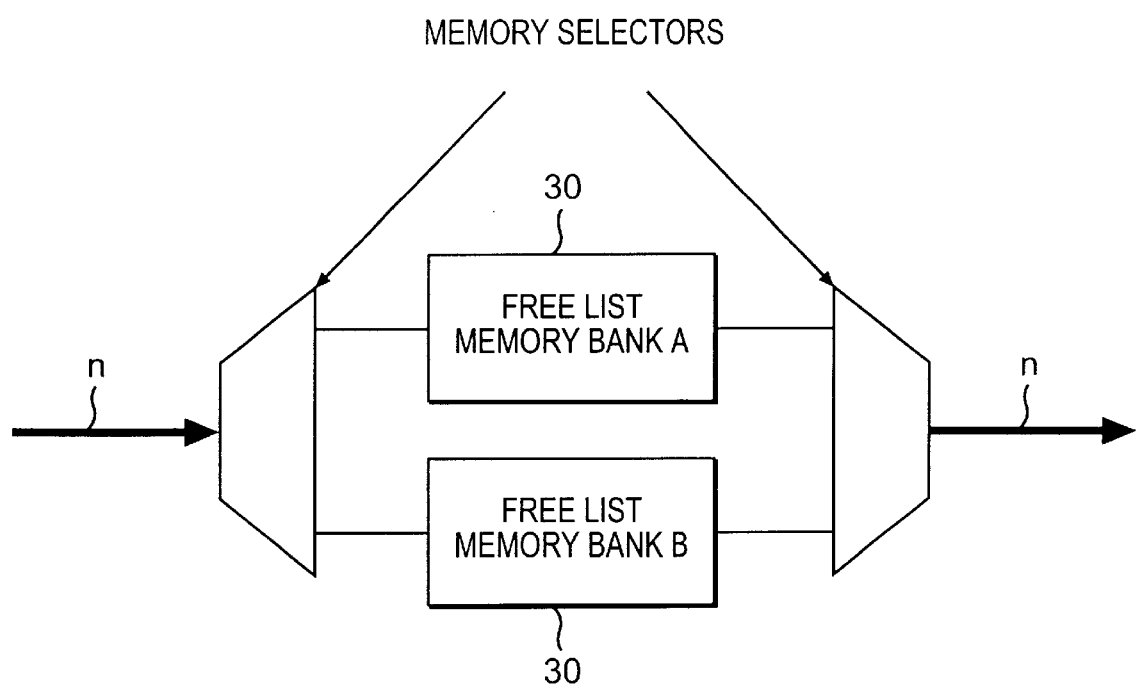

FIG. 4a depicts one possible single memory implementation of free list memory 30. A dual port memory element, similar to the type that may be used for the port bitmap memory (FIGS. 3a–3b), represents one approach. If required, multiple elements could be placed together to achieve the desired memory width and depth. A banked memory implementation (two memories shown) is shown in FIG. 4b.

Figure 5A:
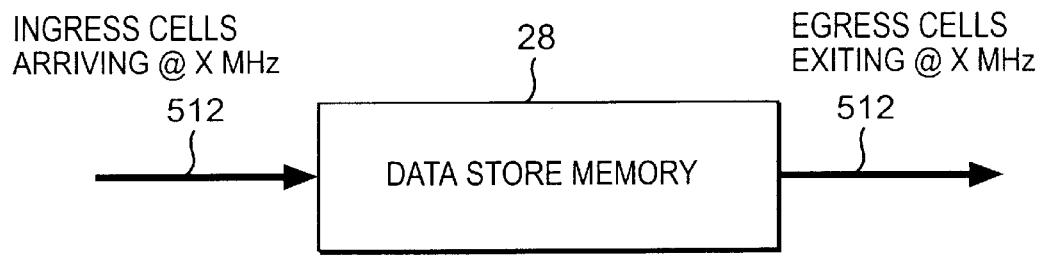
FIG. 5 are single memory and banked memory implementations of the data store memory shown in FIG. 2.
Figure 5B:
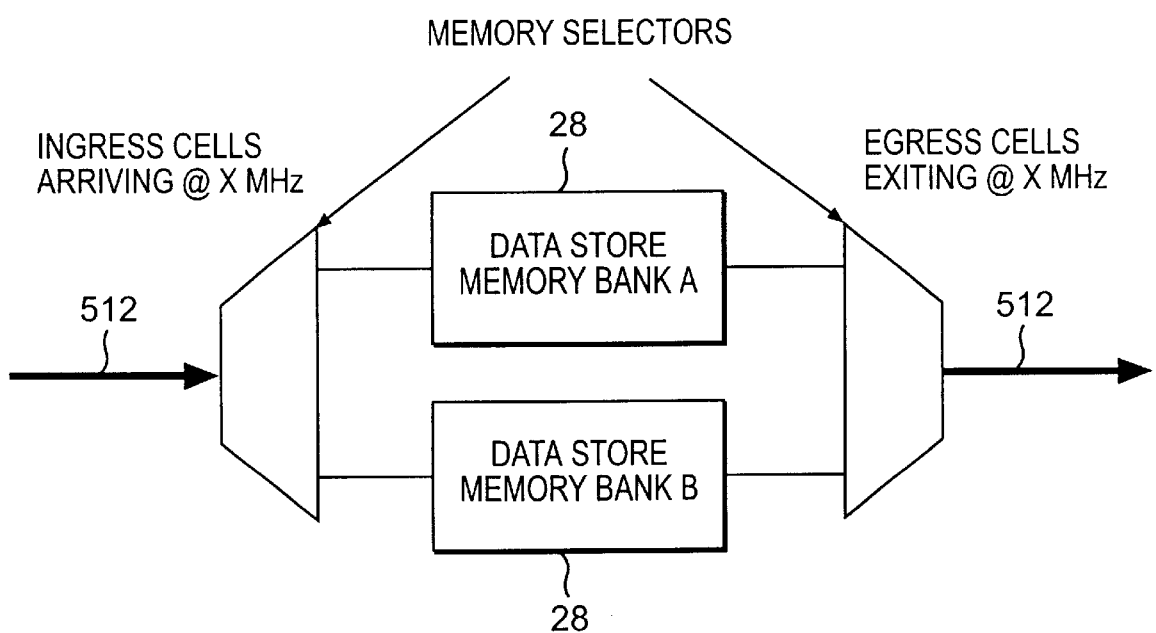

Once free list memory 30 provides a free address, the enqueued cell is stored in the data store 28 at that cell address. The data store holds all the cells residing in the switch, and should be capable of receiving the full ingress rate and transmitting at the full egress rate. The width of the memory is assumed to equal a cell. While faster memories would permit a reduction in width, they require an increase in depth for the same amount of storage. The depth may be determined by a set of target performance requirements, such as cell loss and delay, and the availability of larger commercial memories. A single memory implementation capable of supporting the full input/output bandwidth, is shown in FIG. 5a. To achieve a particular desired width, a number of these memories may be placed in parallel. FIG. 5b, on the other hand, depicts a possible banked memory implementation wherein the read and write operations are directed to different banks. This approach exploits the fact that the read address is known ahead of time (dequeuing a cell) and the write address (enqueue of a cell) can be selected to avoid two accesses per memory. This in turn permits larger capacity switches by effectively doubling the memory accesses.

The cell is also stored in the appropriate output port queue(s) 32 at the specified cell address. The queues 32 should be able to receive the full input rate and issue cells at the output rate. The output port register queue is a function of the number of priorities and loss performance. A number of possible implementations exist for the memory element depending on the speed of available memory and the size requirements.

Referring once again to FIG. 2, the cell address obtained from free list memory 30 is also used as an index to multicast memory 34. Consistent with the present invention, the multicast memory may be used to keep track of the number of copies of the cell transmitted from the switch, as described in greater detail below. During a cell dequeue sequence, the cell address is extracted from an output port queue, and is used to read the cell from the data store. If the multicast memory determines that no more copies of the cell are to be transmitted from the switch, the cell address is returned to the free list for future use.

Figure 6:
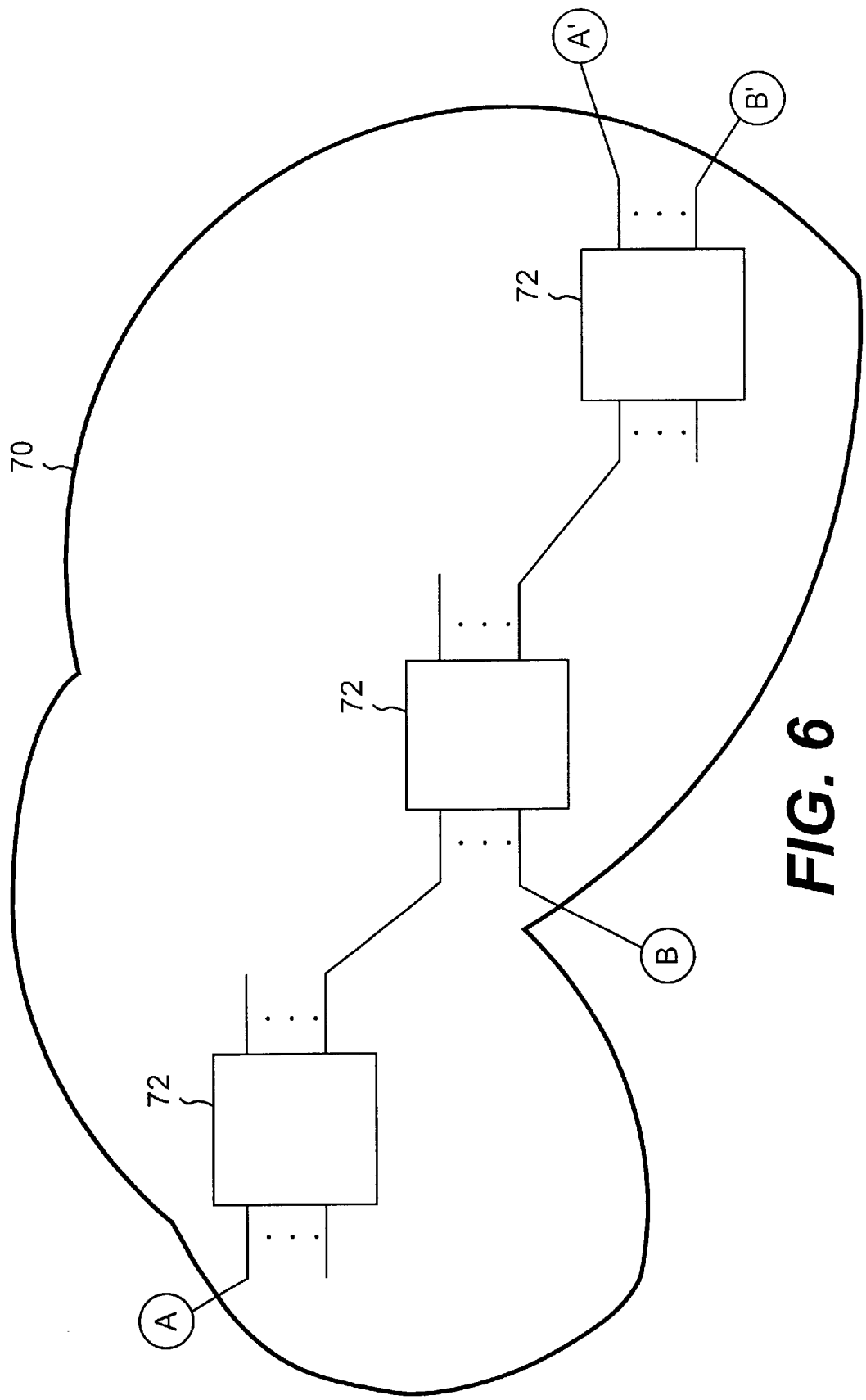
FIG. 6 is a high-level block diagram of a network consistent with the present invention.

FIG. 6 shows a high level communications network 70 within which methods and apparatus consistent with the present invention may function. As shown, a plurality of end nodes A, B, A', and B' connect to the network and serve as the sources and sinks of network traffic, i.e., cells. As previously noted, these cells in turn pass through one or more network switches 72, only three of which are shown for the sake of clarity, on their way to specified end points. Of course, one of ordinary skill will appreciate that the particular configuration of switches and nodes in FIG. 6 is illustrative, and that the number, layout, and interconnection of switches and nodes in an actual network may vary.

Figure 7:
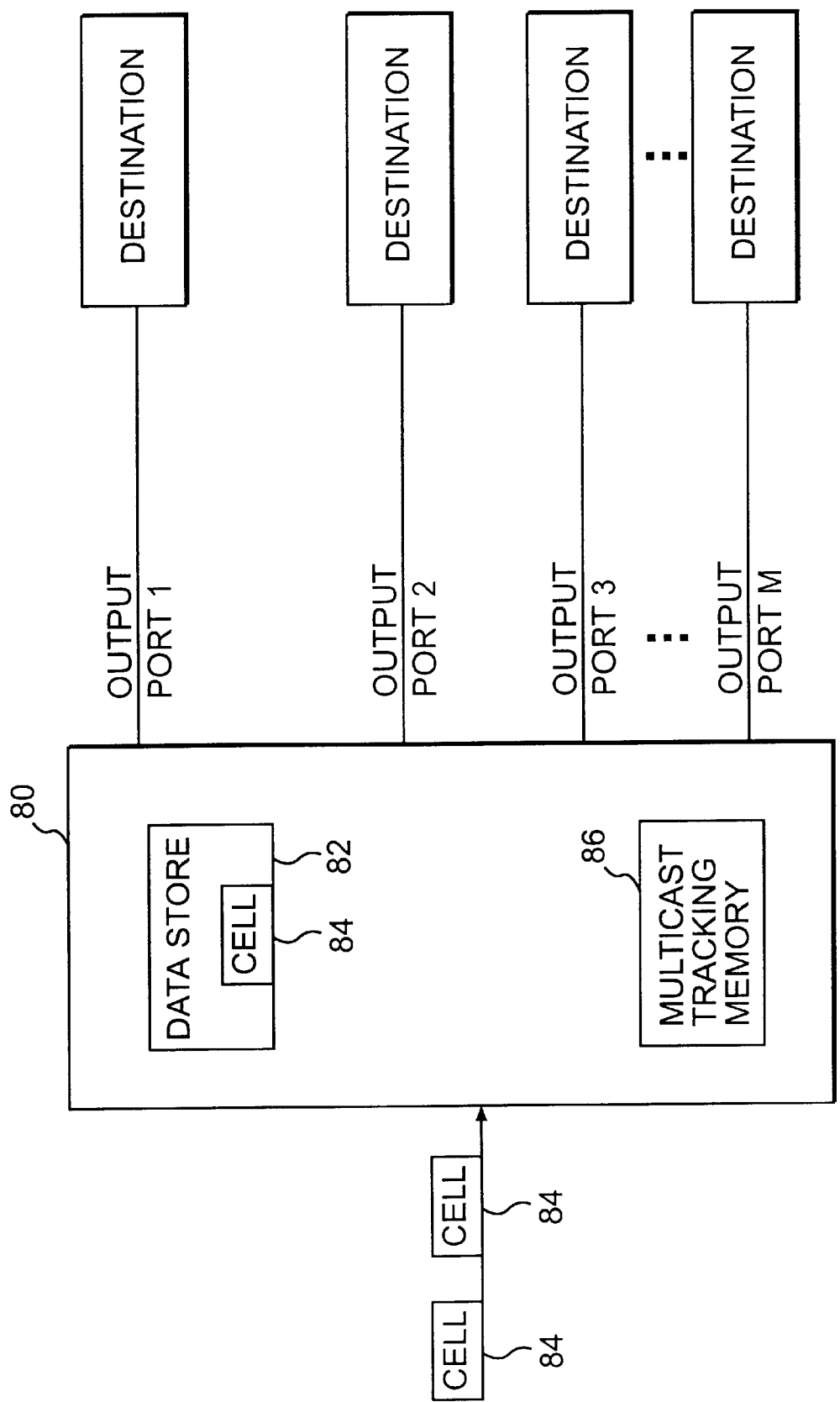
FIG. 7 is a block diagram of a common memory switch consistent with the present invention.

FIG. 7 portrays a simplified block diagram of common memory switch 80 useful for discussing methods and apparatus for multicast cell tracking consistent with the present invention. As shown, switch 80 includes a data store 82 (similar to data store 28 of FIG. 2), which acts as a central buffer where incoming cells 84 are stored. Common memory switch 80 also contains a multicast tracking memory 86 (similar to multicast memory 34 of FIG. 2). Consistent with the present invention, a minimal number of accesses of the multicast memory 86 per cycle are required to keep track of copies of cells to be multicast, thereby lowering the memory bandwidth requirement of the multicast memory in a common memory switch.

Toward this end, one implementation provides individual port memories or output port registers corresponding to and associated with the output ports of a switch. This implementation requires only two memory access per memory per cycle, thereby lowering the operating speed of the multicast memory from as much as three times the cell rate (as with some existing implementations) to the actual cell rate. This permits the use of a greater assortment of memories for the multicast tracking memory because the speed constraints are reduced. Although increasing the number of memories used is higher in this implementation compared with some known approaches, methods and apparatus consistent with the present invention allow for more rapid operation of a multicasting switch. In one banked memory implementation, full rate cell dequeue is achieved.

Figure 8:
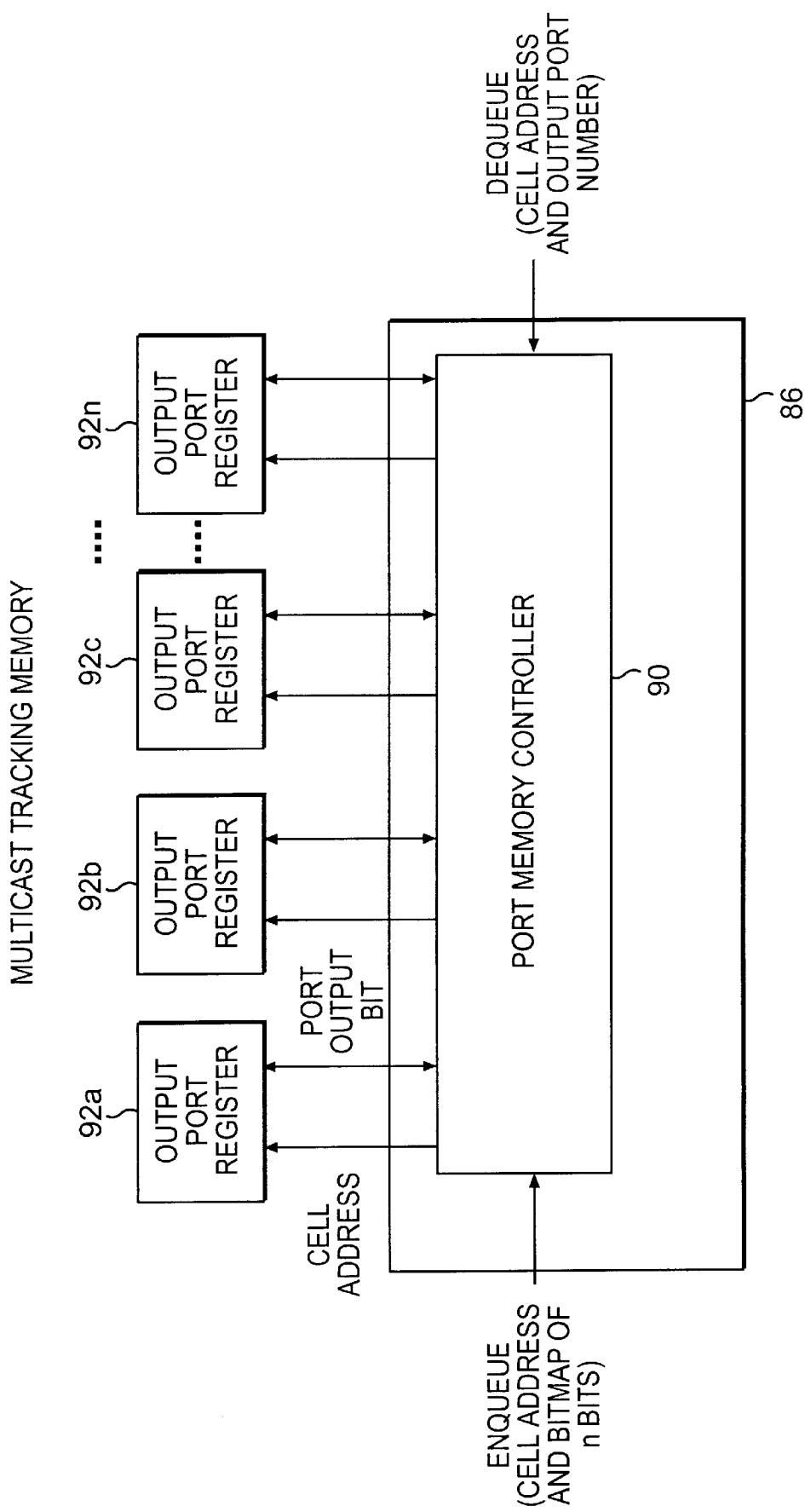
FIG. 8 is a block diagram of a port memory multicast tracking memory consistent with the present invention.

FIG. 8 depicts one implementation of a multicast cell tracking memory 86 consistent with the present invention. The multicast memory is shown to include a port memory controller 90, a hardware component which, for example, includes a memory access element and an element for comparing bits. As shown, the port memory controller 90 is in communication with a plurality of output port registers 92a, 92a, 92c, ...92n, one for each output port of the switch, and performs various read and write operations on the output port registers when cells are enqueued and dequeued, as described below. A bit map indicates the switch output ports from which a cell is to be transmitted. These output port registers work in conjunction with port memory controller 90 to track from which output ports a cell is to be transmitted and, with that information, whether or not the last copy of a cell has left the switch, as described in greater detail below.

Figure 9A:
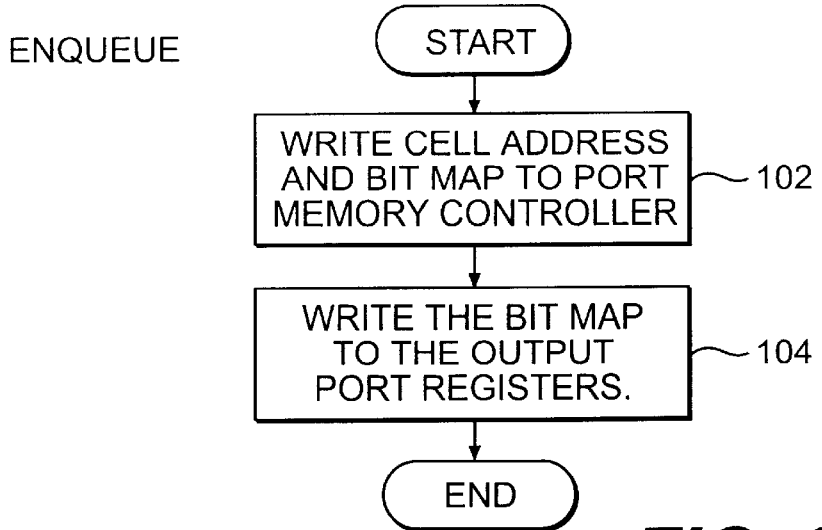
FIGS. 9a–9b are flowcharts detailing the steps for a port memory multicast tracking implementation consistent with the present invention.
Figure 9B:
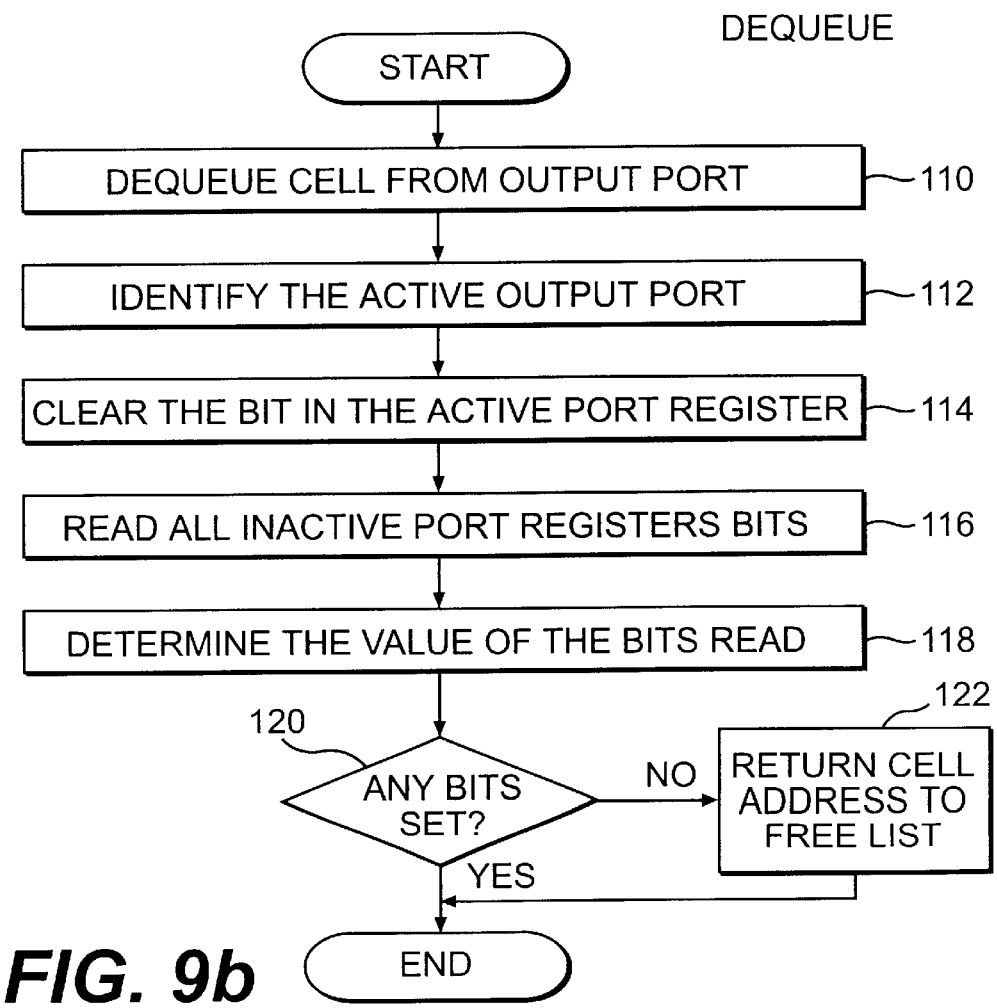

FIGS. 9a and 9b show flowcharts detailing the read operations from and the write operations to the output port registers. Systems and methods consistent with the present invention contemplate use of a "bit map" to identify the switch output ports from which cell copies are to be transmitted. For purposes of this discussion, the phrase "bit map" is broadly defined, and intended to encompass any string or collection of indicators. In one embodiment, the bit map is a string or collection of bits, and a single bit is written to each output port register. A set bit (e.g., "1") indicates that a cell copy is to be transmitted from a switch output port. After the cell copy has been transmitted from the switch (dequeued), the value of the bit in the output port register associated with the output port from which the cell was transmitted is modified to indicate that the cell copy has exited that output port. The bits from the other output port register memories are read and tested to determine whether additional cell copies remain to be transmitted from the switch.

Figure 10:
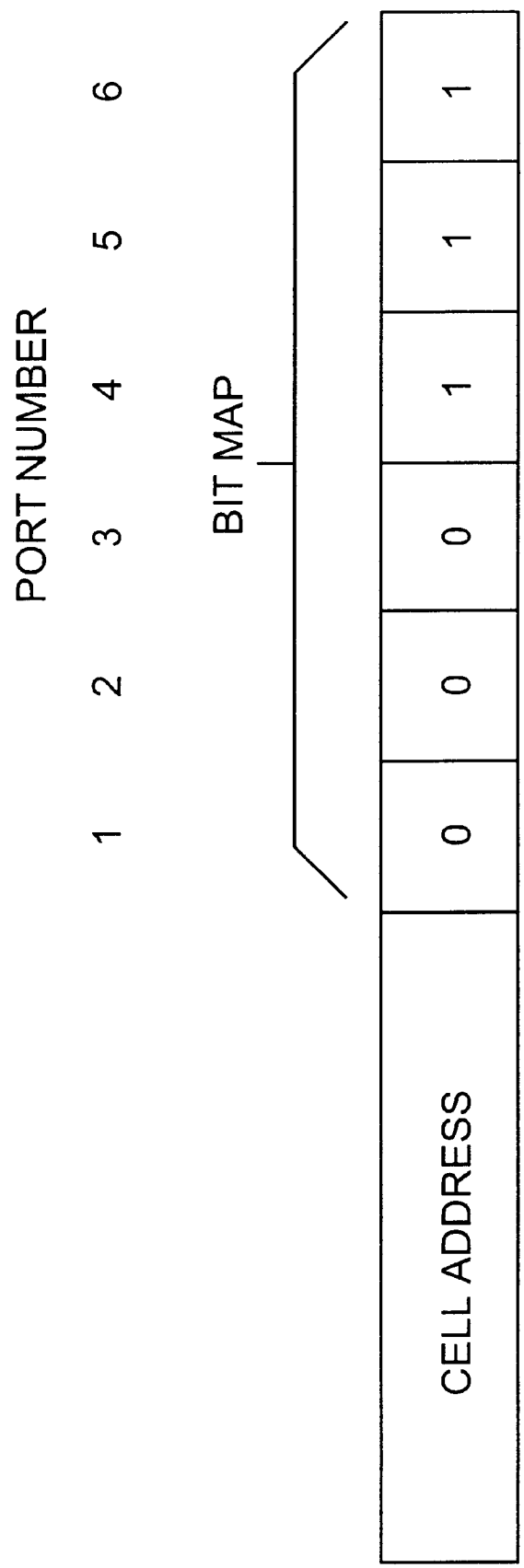
FIGS. 10 is an illustration of the relationship between the switch output ports and the bit map received by a port memory controller consistent with the present invention.

As shown in FIG. 9a, after a cell has entered the switch (enqueue), the cell address obtained from the free list memory and a bit map are supplied to the port memory controller (step 102). The cell address input to the port memory controller is the address in the data store 28 at which the cell was stored on enqueue. In one embodiment, the bit map input to the port memory controller 90 with the cell address includes one bit for each output port. Since each port register has an associated output port, the length of the bit map is determined by the number of switch output ports. Thus, as shown in FIG. 10, a bit map for use with a switch having six output ports would have six bits. The value of the bits in the bit map is used to indicate the output ports from which cell copies are to be transmitted. In FIG. 10 the set bits in the fourth, fifth, and sixth positions indicate a cell copy is to be transmitted to the intended destinations from the associated output ports, i. e., ports 4–6. The bit map may be generated by the switch from the cell header.

Figure 11:
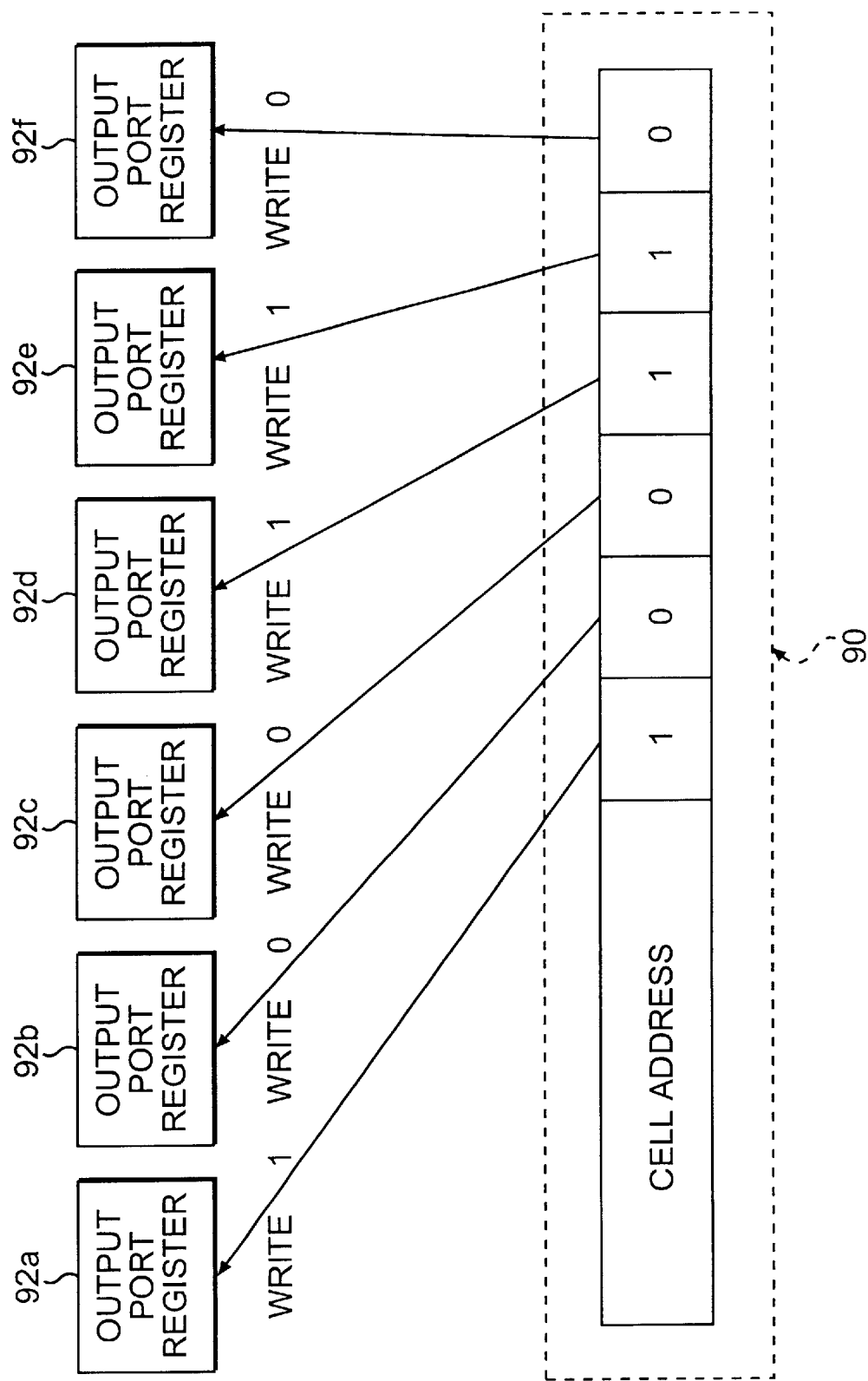
FIG. 11 is an illustration of an example of a port memory write operation on a cell enqueue consistent with the present invention.

With continuing reference to FIGS. 8 and 9a, port memory controller 90 thereafter writes the bits of the bit map to the output port queues (step 104), and appends the associated cell address to the end of the port registers. The bits are stored in the output port registers at the cell address corresponding to the address at which the cell was stored in the data store. That is, if a cell has been stored at data store address X, the bits of the bit map associated with that cell are similarly stored at cell address X in the output port registers. Once enqueued, the cell may be dequeued from the switch at the appropriate time based on, for example, cell priority, queue fill, and the like. FIG. 11 illustrates the step of writing a bit map to the output port registers. In this example, cell copies are to be transmitted from switch output ports 1, 4, and 5, as indicated by the set bits in the first, fourth, and fifth bit map positions. These bits are written to the appropriate output port registers 92a–92f at the cell address.

FIG. 9b illustrates the steps for a dequeue sequence consistent with the present invention. Once the cell has been dequeued (step 110), the active output port, i.e., the port from the cell was transmitted, is identified (step 112). In particular, the output port register associated with the output port from which the cell was transmitted sends to the port memory controller 90 the output port number and the cell address. Port memory controller 90 clears the bit in the output port register associated with the active output port to indicate that a cell copy was successfully transmitted from the active output port (step 114). Port memory controller 90 also performs a read operation on the output port registers associated with inactive output ports to determine, based on the value of the bit stored at the cell address, whether any remaining copies of the cell need to be dequeued (step 116).

Figure 12:
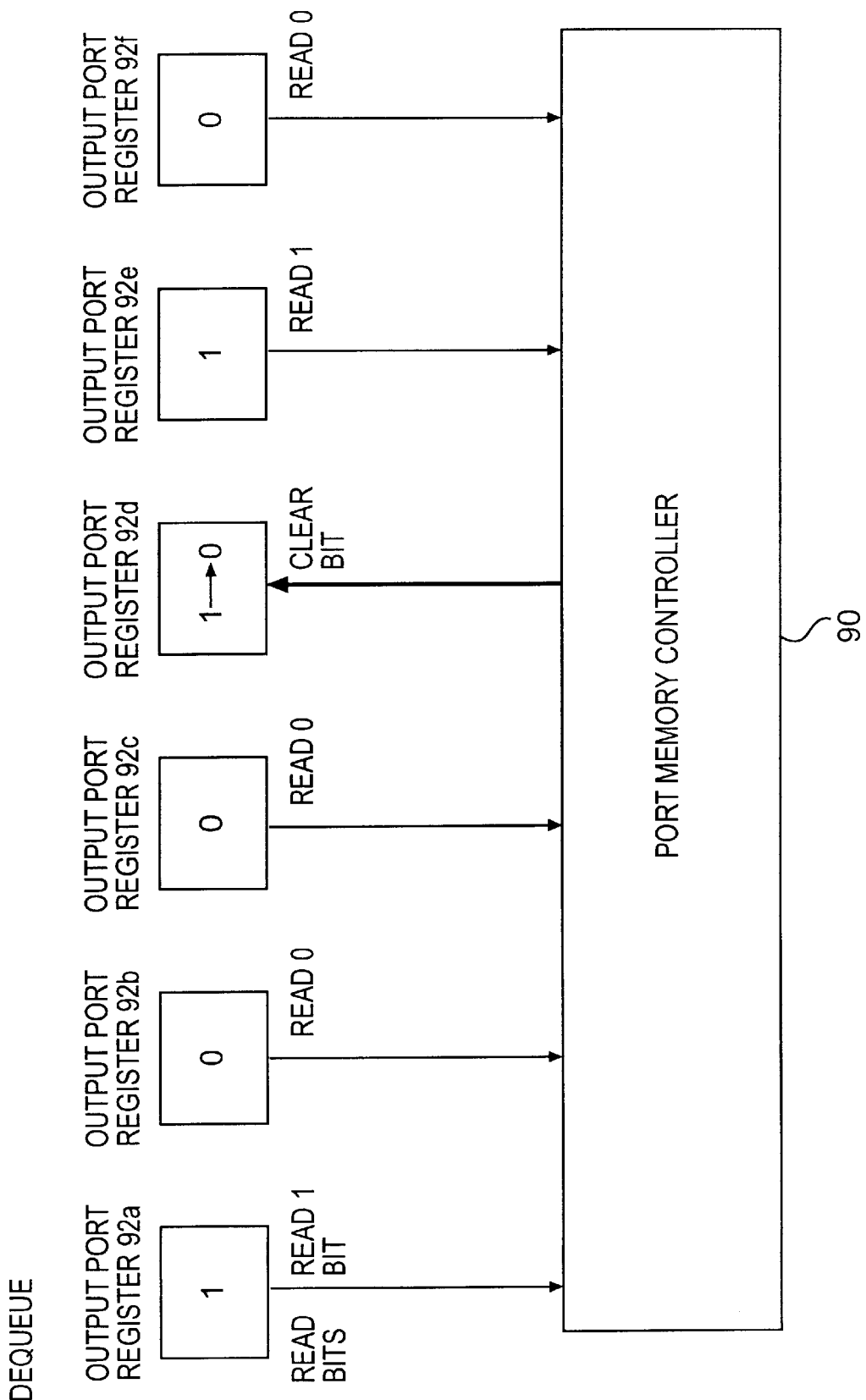
FIG. 12 is an illustration of an example of read and write port memory operations on a cell dequeue consistent with the present invention.

FIG. 12 depicts the steps of reading from and writing to the output port registers on cell dequeue (steps 114 and 116 in FIG. 10b). Assuming output port #4 dequeued the cell copy, the bit in the associated output port register, i.e., register 92d, is cleared and the bits in registers 92a–c and 92e–f are read. Although all of the port registers are preferably read at the same time, i.e., in parallel, the registers may be read sequentially or in some other manner, e.g., randomly. Furthermore, it should be appreciated that while the steps of clearing and reading are preferably done simultaneously, these operations may be done sequentially.

The port memory controller 90 then determines the values of the bits read from the port memories (step 118). If any of these bits are set (step 120), additional copies of the cell remain to be transmitted from a switch output port. If none of the bits read are set, the last copy of the cell has been transmitted from the switch. In that case, the cell address may be returned to the free list memory for future use (step 122).

In summary, consistent with the present invention, on a cell enqueue, a port memory controller writes appropriate bits from a bitmap to appropriate output port registers simultaneously. On a cell dequeue, the port memory controller writes to one port memory and simultaneously reads from all other port memories. Thus, there are two memory accesses per memory per cycle. Although a greater number of memories are required (i.e., equal to the number of output ports), the use of a parallel access strategy operates to reduce the memory accesses per memory per cycle from some known implementations. This memory access reduction in turn reduces the speed at which the memory must be able to function from three times the cell rate in the prior art implementation to the cell rate.

Figure 13:
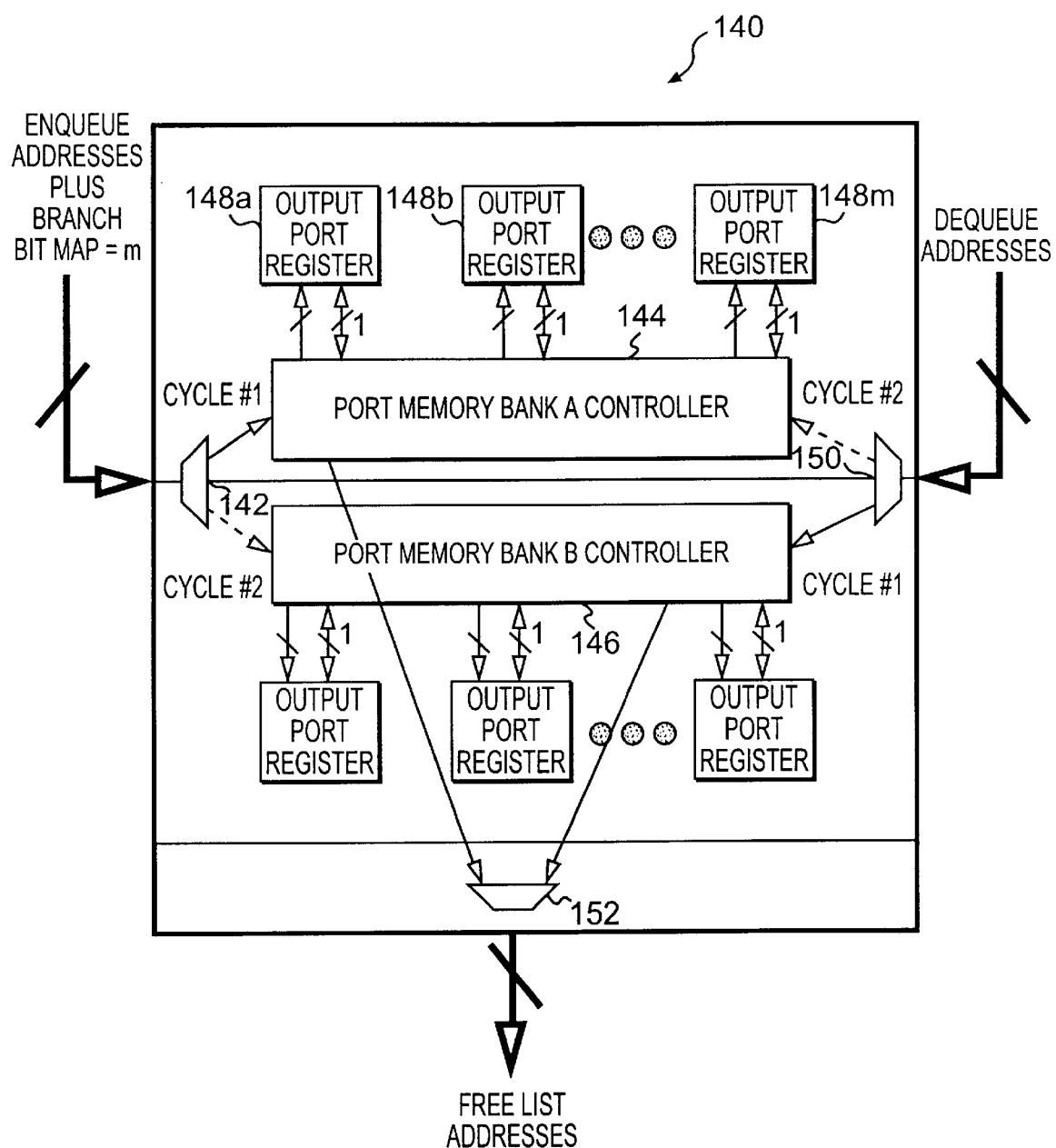
FIGS. 13–14 are block diagrams illustrating banked memory implementations consistent with the present invention.

Consistent with the present invention, banking is employed to reduce the number of accesses from two to one per memory per cycle. FIG. 13 illustrates a block diagram of a multicast tag engine 140 featuring banked memories. As discussed above in relation to FIG. 4b, free list memory 30 may be implemented using banked memories, with each memory containing free addresses. During cell enqueue, a free address is selected from one of the banks, e.g., odd numbered addresses from Bank A and even numbered addresses from Bank B. Depending on which bank the cell address came from, the cell address is routed by selector 142 to the appropriate port memory bank controller 144, 146. The bit map accompanying the cell address is then written to the branch memories, i.e., output port registers, associated with the controller, i.e., if the cell address was routed to controller 144, the bit map is written to output port registers 148a–m and stored at the cell address therein. In the embodiment shown, each register receives one bit of the bit map, although other arrangements are certainly possible.

On cell dequeue, the active output port register (i. e., the queue from which the cell copy was sent) provides the cell address to the multicast engine. As with the enqueue, the cell address is routed by selector 150 to the appropriate controller, i.e., in the example above, odd numbered addresses would be routed to Bank A and even numbered addresses to Bank B. Although not specifically shown in FIG. 14, an active register identifier may also be provided as input to the engine on dequeue. This information may be obtained from the timing of the dequeue. More particularly, if the output ports all dequeue a cell copy during one time interval, the active queue can be identified by when the address arrives at the tag engine. At this point, the bit in the output port register associated with the active port is cleared to signify the dequeue. The appropriate controller also reads the bits from the outport port registers associated with the inactive ports. Although preferably done simultaneously, this write (clear)/read sequence may be done sequentially, etc. A bit test, performed for example by the appropriate controller, determines if there are any remaining cell copies to be dequeued. Once all copies have been dequeued, the cell address may be returned to the free list memory. Bank multiplexer 152 takes all the free list addresses generated from the bank A controller and all the free list addresses generated from the bank B controller and forms the total number of addresses being returned to the free list.

Figure 14:
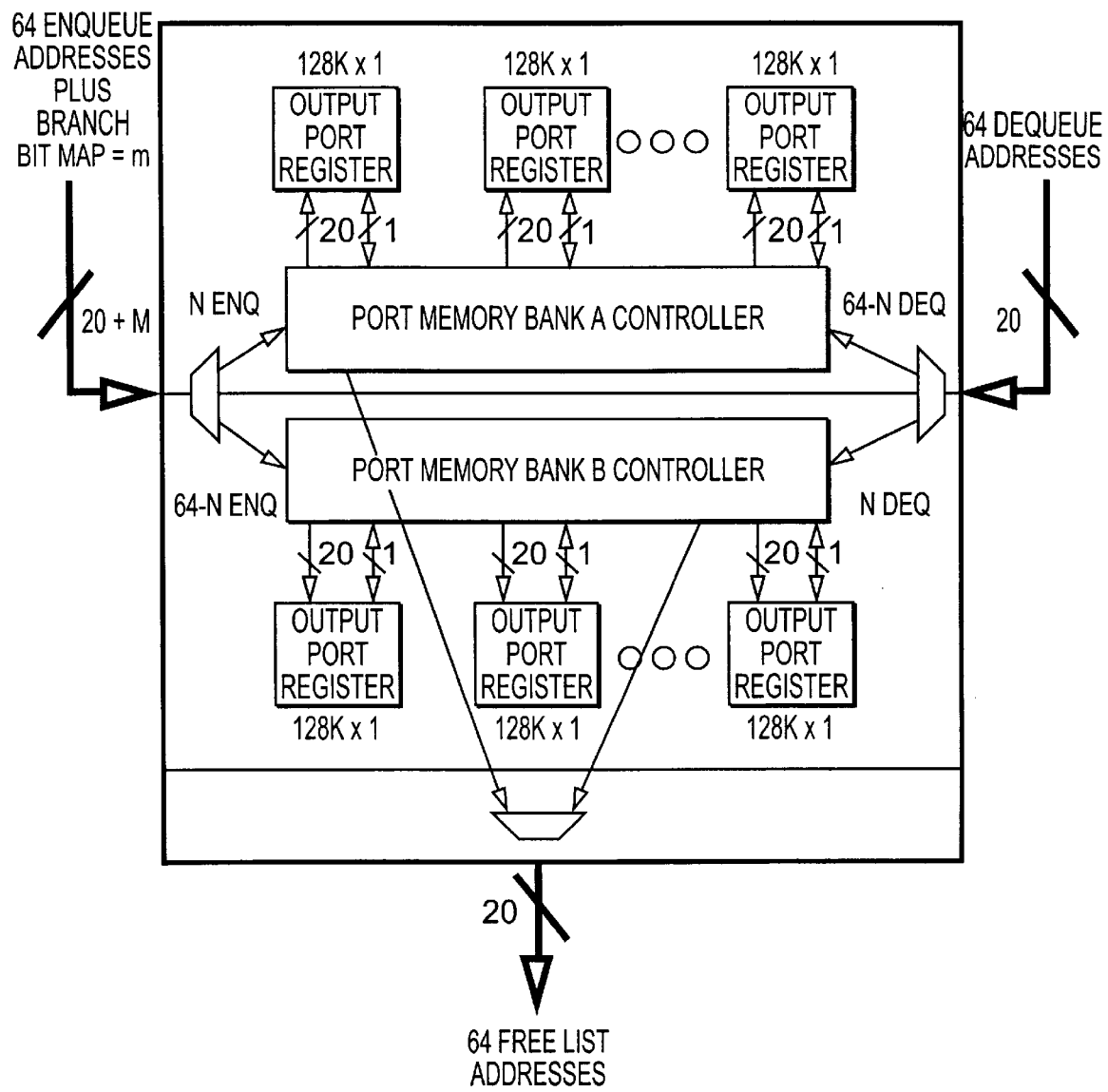

It may be desirable to balance the load between the banks of memories. Toward this end, in one implementation, if the dequeued cell had an even numbered cell address, the next cell address provided by the free list memory would be odd numbered. This is shown in FIG. 13 by the alternating solid and dashed arrows extending between selector 142 and bank A controller and selector 150 and bank B controller. Thus, under this approach, an enqueue and a dequeue occur simultaneously, with enqueue addresses going to one bank and dequeue addresses going to the other, thereby spreading the load across both banks evenly. It should be appreciated that this in turn allows a full rate cell dequeue with slower memory. FIG. 14 illustrates this load balancing for a switch with 64 outputs.

Figure 1:
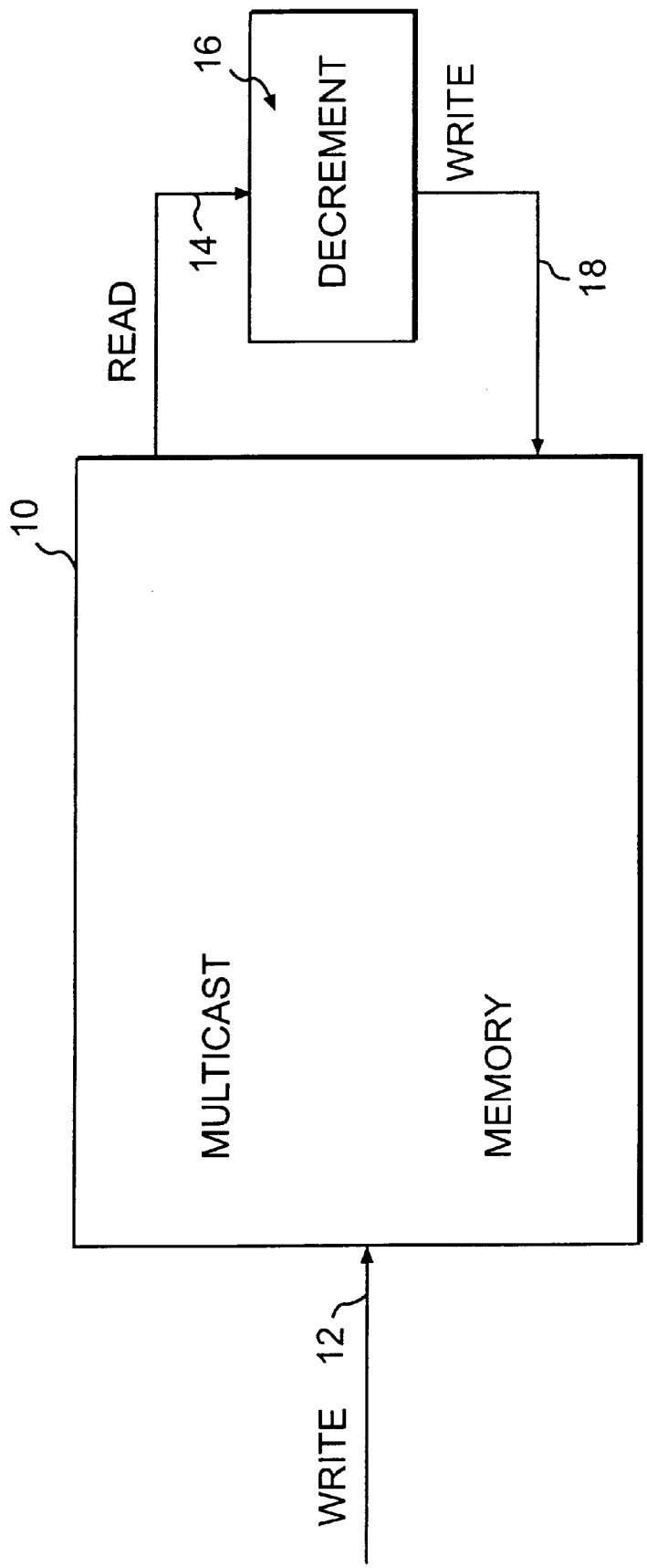
FIG. 1 is a block diagram representation of a prior art single memory multicast counting implementation.
Figure 15:
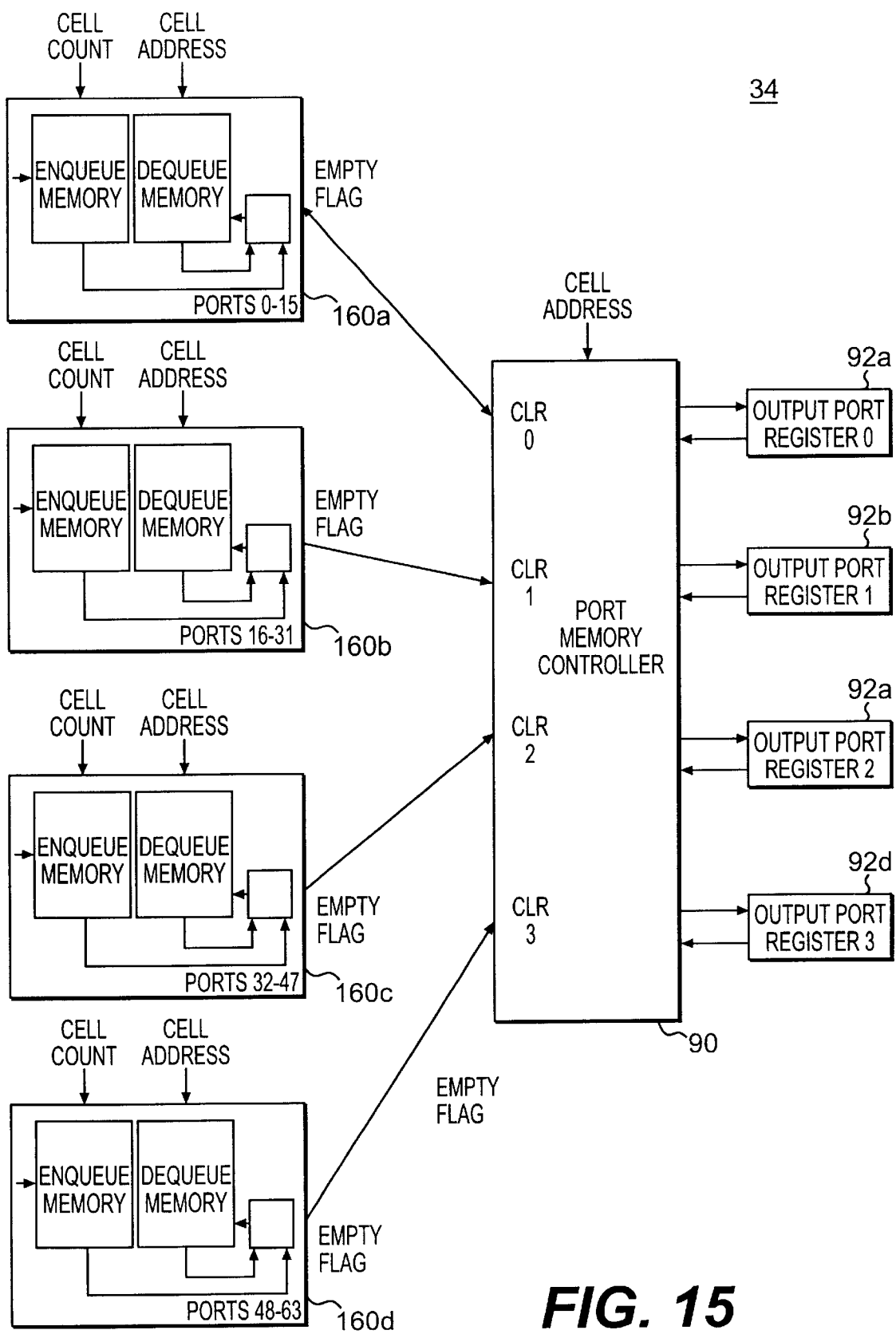
FIG. 15 is a high level block diagram of a two-tiered structure for performing the functions of a multicast memory consistent with the present invention.

One of ordinary skill can appreciate how the present invention may be used in connection with the invention described in patent application Ser. No. 08/994,792, incorporated herein by reference and discussed above. To exploit the cost effectiveness of that invention (i.e., one memory for enqueue and one for dequeue used to count multicast cells) and still dequeue at the full rate (an advantage of the present invention), a two-tiered structure may be used, such as that shown in FIG. 15, to perform the functions of the multicast memory 34 of FIG. 2. As shown in FIG. 15, a number of switch output ports may be grouped and associated with a single output port register. Thus, for the embodiment of FIG. 14, the 64 switch outputs may be arranged into four (4) groups 160a–d, each group being associated with a single output port register 92a–d. For example, ports 0–15, ports 16–31, ports 32–47, and ports 48–63 may be grouped and associated with output port registers 0, 1, 2, and 3, respectively. When a cell is dequeued from an output port in a group, the counting solution described in the Ser. No. 08/994,793, application is invoked. When the last cell copy is transmitted from the group (i.e., count=0), an empty flag is sent to the port memory controller 90 and the bit in the output port register associated with the group is cleared. Once the bits in all of the output port registers are clear i.e., when the last copy of the cell has left the switch, the cell address may be returned to the free list. Of course, the two-tiered structure may also include a single multicast cell count memory, such as that shown in FIG. 1, instead of the pair of memories shown in FIG. 15.

Systems and methods consistent with the present invention thus permit slower memories to be used as multicast cell tracking memories in a switch. The banked implementation shown in FIGS. 13–14 permit a full rate cell dequeue with slower memory. Speed constraints of external memories, which tend to be larger and slower than the smaller and faster internal memories associated with prior art implementations, become less of a problem. Numerous advantages flow from the ability to use a wider variety of memories, not the least of which are cost savings and improved performance.

It will be appreciated by those skilled in this art that various modifications and variations can be made to the port memory multicast strategy consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

What is claimed is:

1. A method for tracking multicast cell copies in a switch in an ATM network, the switch including a port memory controller and a plurality of output ports each having an associated output port register, the method comprising the steps of:

enqueuing a cell into the switch;

receiving a bitmap into the port memory controller on the enqueue of a cell into the switch, the bitmap including a bit corresponding to each output port register;

writing to each output port register a bit from the bitmap corresponding to that port register;

dequeuing a copy of the cell from an output port of the switch;

clearing the bit in the output port register associated with the output port from which the cell copy was dequeued while reading the bits in the other output port registers; and testing the bits read from the other output port registers to determine, based on the value of the bits read, if the last copy of the cell has been dequeued from the switch.

2. The method of claim 1 further comprising the step of determining the length of the bit map based on the number of output ports.

3. The method of claim 1 wherein the switch includes a data store memory for storing the cells enqueued to the switch, and wherein the method further comprises the step of storing an enqueued cell at a cell address in the data store memory.

4. The method of claim 1 wherein the step of writing includes the substep of writing the bit of the bit map to the output port register at a corresponding cell address in that register.

5. The method of claim 1 wherein the step of writing includes the substep of writing the bits of the bit map to the output port registers in parallel.

6. The method of claim 1 wherein the substep of reading the bits in the other output port registers includes the substep of reading the bits in parallel.

7. The method of claim 1 further comprising the step of returning the cell address to a list of cell addresses available for storing enqueued cells when the last copy of the cell has been dequeued.

8. A switch for tracking multicast cell copies and including a plurality of output ports from which cell copies are transmitted toward destinations, the switch comprising:

a plurality of output port registers, each output port register being associated with at least one switch output port;

a port memory controller for receiving a bit map on the enqueue of a cell into the switch, the bit map including a bit corresponding to each output port register, the controller including;

means for writing to each output port register the bit from the bit map corresponding to that port register;

means for clearing the bit in the output port register associated with the output port from which a cell copy is dequeued while reading the bits in the other output port registers; and means for testing the bits read from the other output port registers to determine the value of the bits read.

9. The switch of claim 8 further comprising means for generating the bit map from the enqueued cell, the length of the bit map being based on the number of output ports.

10. The switch of claim 8 further comprising a data store memory; and means for storing the cells enqueued to the switch at a cell address in the data store memory.

11. The switch of claim 10 wherein the port memory controller includes means for writing the bit of the bit map to the output port register at a corresponding cell address in that port register.

12. The switch of claim 11 wherein the means for writing includes means for writing the bits of the bit map to the output port registers in parallel.

13. The switch of claim 8 wherein the means for reading the bits in the other output port registers includes means for reading the bits in parallel.

14. The switch of claim 8 further comprising means, operative when the last copy of the cell has been dequeued, for returning the cell address to a list of cell addresses available for storing enqueued cells.

15. A method for tracking multicast cell copies in a switch in an ATM network, the switch including a port memory controller and a plurality of groups of output ports, each group having an associated output port register, the method comprising the steps of:

enqueueing into the switch a cell to be dequeued from the switch;

receiving a bit map into the port memory controller on the cell enqueue, the bit map including a bit corresponding to each output port register;

writing to each output port register the bit from the bit map corresponding to that output port register, the bit indicating that at least one copy of the enqueued cell is to be dequeued from the group of output ports associated with that output port register;

maintaining a count of the copies of the cell that have been dequeued from each group of output ports;

determining when the last copy of the cell has been dequeued from a group of output ports; and clearing the bit in the output port register after the last copy of the cell has been dequeued from the group associated with the output port register.

16. The method of claim 15 wherein the step of maintaining includes the substeps of:

writing a cell count value to a first multicast cell count memory on the cell enqueue;

retrieving the cell count value from the first memory after a first cell dequeue;

decrementing the cell count value to reflect the first cell dequeue; and transferring the decremented cell count value to a second memory.

17. The method of claim 15 wherein the step of determining includes the substep of determining when the cell count value has a value of zero.

18. The method of claim 15 further comprising the steps of:

storing the enqueued cell at a cell address in a memory;

determining when the last copy of the cell has been dequeued from the switch; and returning the cell address to a list of cell addresses available for storing enqueued cells once the last copy of the cell has been dequeued from the switch.

19. The method of claim 18 wherein the step of determining when the last copy has left the switch includes the substep of determining the value of a plurality of bits stored in the output port registers.

20. A switch for tracking multicast cell copies and including a plurality of output ports from which cell copies are transmitted toward destinations, the switch comprising:

a plurality of output port registers, each output port register being associated with at least one switch output port; and first and second port memory controllers, at least one of the controllers receiving a bit map on the enqueue of a cell into the switch, the bit map including a bit corresponding to each output port register in a group of output port registers associated with the at least one controller that received the bit map, the controller including means for writing to each output port register in the group the bit from the bit map corresponding to that port register.

21. The switch of claim 20 further comprising means for generating the bit map from the enqueued cell, the length of the bit map being based on the number of output ports.

22. The switch of claim 20 further comprising a data store memory for storing the cells enqueued to the switch at a cell address in the data store memory.

23. The switch of claim 22 further comprising means for directing the bit map to at least one of the port memory controllers based on the cell address.

24. The switch of claim 23 wherein the means for directing includes means for determining whether the cell address is even or odd.

25. The switch of claim 23 wherein the first and second port memory controllers comprise means for writing the bit of the bit map to the output port register of the group at a corresponding cell address in that output port register.

26. The switch of claim 25 wherein the means for writing comprises means for writing the bits of the bit map to the output port registers of the group in parallel.

27. The switch of claim 23 further comprising means, operable after a copy of the enqueued cell is dequeued from an outport of the switch, for clearing the bit in the output port register associated with the output port from which the cell copy was dequeued; and means for reading the bits in the other output port registers of the group.

28. The switch of claim 27 further comprising means for testing the bits read from the other output port registers to determine the value of bits read.

29. The switch of claim 28 further comprising means, operative when the last copy of the cell has been dequeued, for returning the cell address to a list of cell addresses available for storing enqueued cells.

30. A method for tracking multicast cell copies in a switch in an ATM network, the switch including first and second port memory controllers, a plurality of output ports, a data store for storing cells enqueued to the switch, and a plurality of output port registers, each output port register being associated with at least one switch output port, the method comprising the steps of:

enqueuing a cell into the switch;

receiving a bit map into at least one of the port memory controllers on the enqueue of the cell, the bit map including a bit corresponding to each output port register in a group of registers associated with the at least one controller that received the bit map;

writing to each output port register in the group a bit from the bit map corresponding to that port register;

storing the enqueued cell at a cell address in the data store memory;

directing the bit map to the one port memory controller based on the cell address; and determining whether the cell address is even or odd.

31. A method for tracking multicast cell copies in a switch in an ATM network, the switch including first and second port memory controllers, a plurality of output ports, a data store for storing cells enqueued to the switch, and a plurality of output port registers, each output port register being associated with at least one switch output port, the method comprising the steps of:

enqueuing a cell into the switch;

receiving a bit map into at least one of the port memory controllers on the enqueue of the cell, the bit map including a bit corresponding to each output port register in a group of registers associated with the at least one controller that received the bit map;

writing to each output port register in the group a bit from the bit map corresponding to that port register;

storing the enqueued cell at a cell address in the data store memory;

directing the bit map to the one port memory controller based on the cell address; and writing the bit of the bit map to the output port register at a corresponding cell address in that register.

32. A method for tracking multicast cell copies in a switch in an ATM network, the switch including first and second port memory controllers, a plurality of output ports, and a plurality of output port registers, each output port register being associated with at least one switch output port, the method comprising the steps of:

enqueuing a cell into the switch;

receiving a bit map into at least one of the port memory controllers on the enqueue of the cell, the bit map including a bit corresponding to each output port register in a group of registers associated with the at least one controller that received the bit map;

writing to each output port register in the group a bit from the bit map corresponding to that port register;

dequeuing a copy of the cell from an output port of the switch;

clearing the bit in the output port register of the group associated with the output port from which the cell copy was dequeued; and reading the bits in the other output port registers of the group.

33. The method of claim 32 further comprising the step of testing the bits read from the other output port registers to determine, based on the value of the bits read, if the last copy of the cell has been dequeued from the switch.

34. The method of claim 33 further comprising the step of returning the cell address to a list of cell addresses available for storing enqueued cells when the last copy of the cell has been dequeued.

* * * * *